US009264331B2

(12) United States Patent
Pei et al.

(10) Patent No.: US 9,264,331 B2
(45) Date of Patent: Feb. 16, 2016

(54) HIERARCHICAL ANOMALY LOCALIZATION AND PRIORITIZATION

(71) Applicant: AT&T Intellectual Property I, L.P., Atlanta, GA (US)

(72) Inventors: Dan Pei, Jersey City, NJ (US); Ashley Flavel, Seattle, WA (US); Zihui Ge, Madison, NJ (US); Alexandre Gerber, Madison, NJ (US); Hiren Shah, Morristown, NJ (US); He Yan, Berkeley Heights, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/562,234

(22) Filed: Dec. 5, 2014

(65) Prior Publication Data
US 2015/0085675 A1    Mar. 26, 2015

Related U.S. Application Data

(63) Continuation of application No. 13/221,544, filed on Aug. 30, 2011, now Pat. No. 8,934,352.

(51) Int. Cl.
*H04L 12/26* (2006.01)
*H04L 12/24* (2006.01)

(52) U.S. Cl.
CPC ........ *H04L 43/0823* (2013.01); *H04L 41/0618* (2013.01); *H04L 41/0677* (2013.01)

(58) Field of Classification Search
None
See application file for complete search history.

(56) References Cited

U.S. PATENT DOCUMENTS

| 7,013,084 | B2 | 3/2006 | Battou et al. |
| 7,113,988 | B2 | 9/2006 | Chirashnya et al. |
| 7,577,099 | B1 | 8/2009 | Greenberg et al. |
| 7,649,853 | B1 * | 1/2010 | Nucci ................ H04L 41/022 370/252 |
| 7,836,356 | B2 | 11/2010 | Haas et al. |
| 7,907,535 | B2 | 3/2011 | Agrawal et al. |
| 2002/0174207 | A1 | 11/2002 | Battou |
| 2005/0259571 | A1 | 11/2005 | Battou |
| 2006/0126495 | A1 * | 6/2006 | Guichard ............ H04L 12/2697 370/216 |
| 2007/0050497 | A1 * | 3/2007 | Haley ................ H04L 43/0817 709/224 |

(Continued)

OTHER PUBLICATIONS

Du et al., "LAD: Localization Anomaly Detection for Wireless Sensor Networks," Journal of Parallel and Distributed Computing, vol. 66, No. 7, Jul. 2006 (online version, 15 pages).

(Continued)

*Primary Examiner* — Ian N Moore
*Assistant Examiner* — Latresa McCallum
(74) *Attorney, Agent, or Firm* — Hanley, Flight & Zimmerman, LLC

(57) ABSTRACT

Example methods disclosed herein to localize anomalies in a communication network include identifying a first set of abnormal nodes in the communication network, and including respective ones of the first set of abnormal nodes having a number of normal direct descendent nodes that is less than a combined number of abnormal direct descendent nodes and indeterminate direct descendent nodes in a set of candidate nodes. Such disclosed example methods also include iteratively selecting ones of the set of candidate nodes to include in a set of root cause abnormal nodes representing sources of the anomalies in the communication network. In such disclosed example methods, the ones of the set of candidate nodes are selected based on sizes of respective subsets of the abnormal nodes from the first set of abnormal nodes covered by the candidate nodes.

15 Claims, 10 Drawing Sheets

(56) References Cited

U.S. PATENT DOCUMENTS

| | | | |
|---|---|---|---|
| 2009/0048807 | A1 | 2/2009 | Kikuchi et al. |
| 2009/0135727 | A1 | 5/2009 | Agrawal et al. |
| 2009/0276404 | A1 | 11/2009 | Henigman |
| 2009/0290488 | A1 | 11/2009 | Honma |
| 2009/0307336 | A1* | 12/2009 | Hieb .................. H04L 67/1095 709/220 |
| 2010/0208595 | A1* | 8/2010 | Zhao .................. H04L 41/0659 370/242 |
| 2010/0284283 | A1 | 11/2010 | Golic et al. |
| 2010/0284288 | A1 | 11/2010 | Lee et al. |
| 2011/0131704 | A1 | 6/2011 | Hughes |
| 2011/0154119 | A1 | 6/2011 | Wang et al. |
| 2011/0317548 | A1 | 12/2011 | Pustylnik |
| 2013/0051248 | A1 | 2/2013 | Pei et al. |

OTHER PUBLICATIONS

Akamai, Inc. Website "The Leader in Web Application Acceleration and Performance," http://www.akamai.com/, homepage accessed on Oct. 21, 2011 (1 page).

BGPMON Project Website, "About BGP Monitoring System," http://bgpmon.netsec.colostate.edu/, homepage accessed on Oct. 21, 2011 (1 page).

Gomez, Inc. Website, "Application Performance Management and Monitoring," http://www.gomez.com/, homepage accessed on Oct. 21, 2011 (1 page).

Keynote Systems, Inc. Website, "The Mobile and Internet Performance Authority," http://www.keynote.com/, homepage accessed on Oct. 21, 2011 (1 page).

Limelight, Inc. Website, Limelight Networks: Orchestrate Brilliance Brand Business Content, http://www.limelight.com/, homepage accessed on Oct. 21, 2011 (3 pages).

Aqualab, "Using the Crowd to Monitor the Cloud: Detecting Network Events from Edge Systems," http://www.aqualab.cs.northwestern.edu/projects/NEWS.html, homepage accessed on Oct. 21, 2011 (3 pages).

Balakrishnan et al., "Analyzing Stability in Wide-Area Network Performance," in Proceedings of ACM SIGMETRICS Conference on Measurement and Modeling of Computer Systems, 1997 (11 pages).

Barford et al., "A Signal Analysis of Network Traffic Anomalies," in Proceedings of the 2nd ACM SIGCOMM Workshop on Internet Measurement, 2002 (12 pages).

Brutlag, Jake D., "Aberrant Behavior Detection in Time Series for Network Monitoring," in Proceedings of the 14th Systems Administration Conference (LISA 2000), 2000 (9 pages).

Chandra et al., "End-to-end WAN Service Availability," in Proceedings of the 3rd conference on USENIX Symposium on Internet Technologies and Systems, vol. 3, USENIX Association, 2001 (online version, 12 pages).

Feamster et al., "Measuring the Effects of Internet Path Faults on Reactive Routing," in Proceedings of the 2003 ACM SIGMETRICS International Conference on Measurement and Modeling of Computer Systems, ACM, 2003 (12 pages).

Fielding et al., "Hypertext Transfer Protocol—HTTP/1.1," 1999 (152 pages).

Johnson, David S., "Approximation Algorithms for Combinatorial Problems," in Proceeding of the 5th Ann. ACM Symposium on Theory of Computing (1973) (12 pages).

Krishnan, et al., "Moving Beyond End-to-End Path Information to Optimize CDN Performance," in Proceedings of the 9th ACM SIGCOMM Conference on Internet Measurement, ACM, 2009 (12 pages).

Padhye et al., "Modeling TCP Throughput: A Simple Model and its Empirical Validation," in Proceedings of the ACM SIGCOMM'98 conference on Applications, Technologies, Architectures, and Protocols for Computer Communication, ACM, 1998 (online version, 12 pages).

Padmanabhan et al., "Server-Based Inference of Internet Performance," Technical Report, MSR-TR-2002-39 (online version, 15 pages).

Paxson, Vern, "End-to-End Routing Behavior in the Internet," in Proceedings of SIGCOMM '96, 1996 (online version, 21 pages).

Savage et al., "The End-to-End Effects of Internet Path Selection," SIGCOMM 1999 (online version, 11 pages).

Yan et al., "BGPmon: A real-time, scalable, extensible monitoring system," In Cybersecurity Applications and Technologies Conference for Homeland Security (CATCH), 2009 (online version, 12 pages).

Zhang et al., "PlanetSeer: Internet Path Failure Monitoring and Characterization in Wide-Area Services," in Proceedings USENIX OSDI, 2004 (16 pages).

Zhang, Yin, "Characterizing End-to-End Internet Performance," PhD Thesis, Citeseer, 2001 (158 pages).

Zhang et al., "Effective Diagnosis of Routing Disruptions from End Systems," in Proceedings of USENIX NSDI, 2008 (14 pages).

Kurose et al., "End-to-End Routing Behavior in the Internet, A Retrospective Review," ACM SIGCOMM Computer Communication Review, vol. 36, Issue 5, 2006 (2 pages).

United States Patent and Trademark Office, "Non-Final Office Action," issued in connection with U.S. Appl. No. 13/221,544, dated May 22, 2013 (33 pages).

United States Patent and Trademark Office, "Final Office Action," issued in connection with U.S. Appl. No. 13/221,544, dated Jan. 15, 2014 (32 pages).

United States Patent and Trademark Office, "Notice of Allowance," issued in connection with U.S. Appl. No. 13/221,544, dated Aug. 28, 2014 (16 pages).

United States Patent and Trademark Office, "Supplemental Notice of Allowability," issued in connection with U.S. Appl. No. 13/221,544, dated Nov. 3, 2014 (4 pages).

* cited by examiner

1000

---

Algorithm 1 : Greedy Algorithm for Event Localization Problem
---

Let $A$ denote the output subset  
   Initialize $A = \emptyset, UNCOV = \{x \in N | f(x) = 1\}$      } 1005 for each $u \in UNCOV$ do  
      $SET_u = u$      } 1015  
      for each $v \in D(u)$ do  
         if $f(v) = 1$ then  
            $SET_u = SET_u \cup v$    } 1020  
         end if  
      end for  
      for each $w \in A(u)$ do  
         if $f(w) = 1$ then  
            $SET_u = SET_u \cup w$    } 1025  
         end if  
      end for  
   end for      } 1010 while $UNCOV \neq \emptyset$ do  
      Choose $u \in UNCOV$ such that $|SET_u|$ is maximized  } 1030  
      $A = A \cup u$      } 1035  
      $UNCOV = UNCOV - SET_u$      } 1040  
      for each $i \in UNCOV$ do  
         $SET_i = SET_i - SET_u$    } 1045  
      end for  
   end while

FIG. 10

HIERARCHICAL ANOMALY LOCALIZATION AND PRIORITIZATION

RELATED APPLICATION(S)

This patent arises from a continuation of U.S. patent application Ser. No. 13/221,544 (now U.S. Pat. No. 8,934,352), which is entitled "HIERARCHICAL ANOMALY LOCALIZATION AND PRIORITIZATION" and which was filed on Aug. 30, 2011. U.S. patent application Ser. No. 13/221,544 is hereby incorporated by reference in its entirety.

FIELD OF THE DISCLOSURE

This disclosure relates generally to anomaly processing and, more particularly, to hierarchical anomaly localization and prioritization.

BACKGROUND

In recent years, Internet Service Providers (ISPs) have been rolling out a wide range of value added services beyond basic connectivity, such as web hosting, content distribution network (CDN) services, database services, gaming services, cloud computing, e-commerce server hosting, etc. In many cases, customers access these value added services via an Internet connection and, as such, customers can be dispersed over a wide geographic area. Additionally, the value added services provided by an ISP are often hosted in geographically distributed data centers, which may be co-located with an ISP's different Points of Presence (PoPs). Detecting and localizing end-to-end performance issues for such wide-area services can be useful to an ISP operator for achieving desired end user service quality, such as by enabling fast service impairment detection and flexible mitigation control. Existing techniques for detecting and localizing performance issues and other network anomalies can involve using active probes placed strategically in an ISP's wide-area network that inject probe packets into the network to enable detection of anomalies associated with the locations of the active probes.

BRIEF DESCRIPTION OF THE DRAWINGS

FIG. 10 depicts example pseudocode representative of example machine readable instructions that may be used to implement the flowchart of FIG. 9.

DETAILED DESCRIPTION

Figure 1:
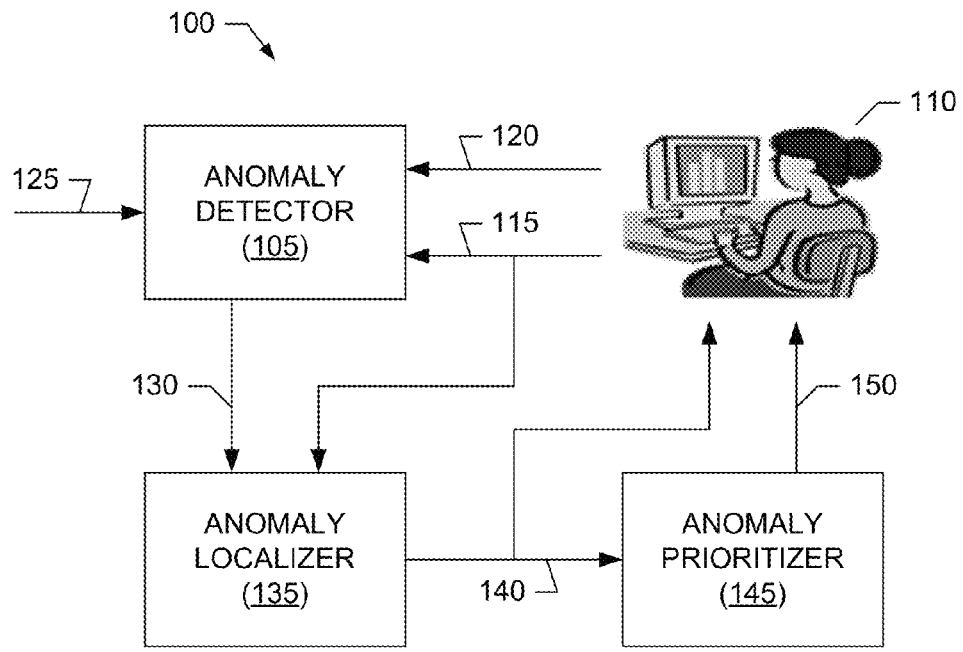
FIG. 1 is block diagram of an example system to perform hierarchical anomaly localization and prioritization.

Methods, apparatus and articles of manufacture for hierarchical anomaly localization and prioritization are disclosed herein. An example method disclosed herein includes obtaining reported status for a plurality of nodes of a hierarchical topology. The reported status for a particular node can be at least one of normal, abnormal or indeterminate. The example method also includes determining a subset of root cause abnormal nodes that covers a set of abnormal nodes in the hierarchical topology indicated by the reported status. In some examples, a root cause abnormal node that is included in the subset of root cause abnormal nodes has a total number of abnormal direct descendent nodes and indeterminate direct descendent nodes that is greater than a number of normal direct descendent nodes of the root cause abnormal node.

In some examples, to determine the subset of root cause abnormal nodes, the method further includes selecting a set of candidate root cause abnormal nodes from the set of abnormal nodes in the hierarchical topology. For example, a candidate root cause abnormal node can be any abnormal node that has a respective number of abnormal direct descendent nodes and indeterminate direct descendent nodes that is greater than a respective number of normal direct descendent nodes of the candidate root cause abnormal node. After selecting the set of candidate root cause abnormal nodes from the set of abnormal nodes, the example method then determines the subset of root cause abnormal nodes from the set of candidate root cause abnormal nodes. For example, for each respective candidate root cause abnormal node, the method can determine a respective subset of the set of abnormal nodes in the hierarchical topology covered by the respective candidate root cause abnormal node. A particular candidate root cause abnormal node covers an abnormal node if, for example, the abnormal node is the particular candidate root cause abnormal node itself, or the abnormal node is a descendant of the particular candidate root cause abnormal node, or the abnormal node is an ancestor of the particular candidate root cause abnormal node. In some examples, the method employs a greedy technique involving selecting a first candidate root cause abnormal node for inclusion in the subset of root cause abnormal nodes if the first candidate root cause abnormal node covers a largest subset of the set of abnormal nodes in the hierarchical topology. The method then continues to iteratively select a next candidate root cause abnormal node covering the next largest subset of the set of abnormal nodes for inclusion in the subset of root cause abnormal nodes.

An example apparatus disclosed herein includes an example candidate selector (e.g., implemented by a first processor) to select a set of candidate root cause abnormal nodes from a set of abnormal nodes identified in a hierarchical topology. As noted above, a particular candidate root cause abnormal node may be any abnormal node that has a total number of abnormal direct descendent nodes and indeterminate direct descendent nodes that is greater than a number of normal direct descendent nodes of the particular candidate root cause abnormal node. The example apparatus also includes an example root cause determiner (e.g., implemented by at least one of the first processor or a second processor) to determine a set of root cause abnormal nodes from the set of candidate root cause abnormal nodes selected by the candidate selector. The set of root cause abnormal nodes is to cover the set of abnormal nodes identified in the hierarchical topology. For example, the root cause determiner can iteratively select candidate root cause abnormal nodes for inclusion in the subset of root cause abnormal nodes based on sizes of the subsets of abnormal nodes in the hierarchical topology covered by the respective candidate root cause abnormal nodes.

In some examples, the apparatus further includes a prioritizer to determine a size (e.g., degree, severity, etc.) of a respective abnormality associated with each root cause abnormal node included in the subset of root cause abnormal nodes. The prioritizer can also determine a scope (e.g., number of end users affected, geographic region affected, etc.) for the respective abnormality associated with each root cause abnormal node included in the subset of root cause abnormal nodes. The prioritizer can further rank the root cause abnormal nodes included in the subset of root cause abnormal nodes based on size and/or scope.

In the preceding examples, the nodes of the hierarchical topology can include, for example, physical, logical and/or geographical network elements at different hierarchical levels in a network. For example, in a network employing the border gateway protocol (BGP), the nodes can include routers, autonomous systems (ASes), AS paths, BGP prefixes, etc., and/or the particular geographic location served by these physical and logical network elements. As another example, in a 3rd generation mobile network, the nodes can include serving GPRS supports nodes (SGSNs, where GPRS refers to the general packet radio service), radio network controllers (RNCs), etc., and/or the particular markets and sub-markets served by these physical and logical network elements.

As noted above, existing techniques for detecting and localizing performance issues and other network anomalies can involve using active probes placed at particular locations in an ISP's wide-area network. The active probes inject probe packets into the network to enable detection of anomalies associated with the locations of the active probes. Such active probe techniques are, therefore, limited in that network anomalies can be localized only to the particular locations at which the active probes are placed. In contrast, the example methods, apparatus and articles of manufacture disclosed herein can be used to localize network anomalies at any specified or identified physical, logical, geographic, etc., node in a network hierarchical topology. The example methods, apparatus and articles of manufacture disclosed herein can also localize anomalies to determine root cause abnormal node(s) using passive, as well as active, network monitoring. Furthermore, in some examples, the methods, apparatus and articles of manufacture disclosed herein can prioritize the root cause abnormal node based on one or more criteria, such as anomaly size, scope, etc.

Turning to the figures, a block diagram of an example system 100 to perform hierarchical anomaly localization and prioritization as disclosed herein is illustrated in FIG. 1. The example system 100 includes an example anomaly detector 105 to detect anomalies associated with one or more nodes of a hierarchical topology. In the illustrated example, the anomaly detector 105 is configured by an example user workstation 110. The user workstation 110 may be implemented by any type of workstation for use by any type of user, operator, administrator, etc. For example, the user workstation 110 may be implemented by a computer workstation, a server, a desktop computer, a notebook computer, a tablet computer, a personal digital assistant (PDA), a smartphone, the example processing system 1200 illustrated in FIG. 12, etc., or any combination thereof.

Figure 2:
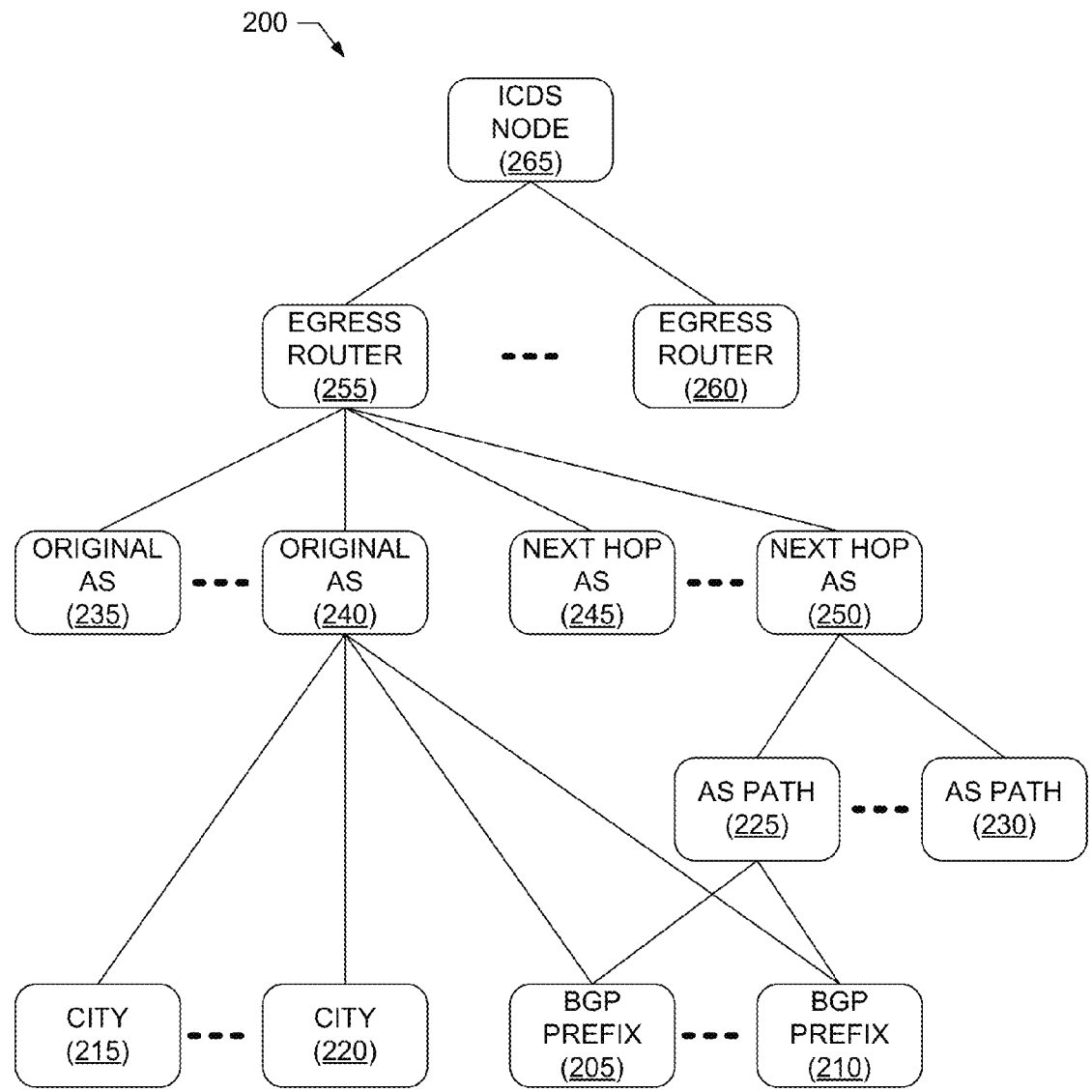
FIG. 2 is a block diagram of a first example hierarchical topology for which the example system of FIG. 1 can perform hierarchical anomaly localization and prioritization.
Figure 3:
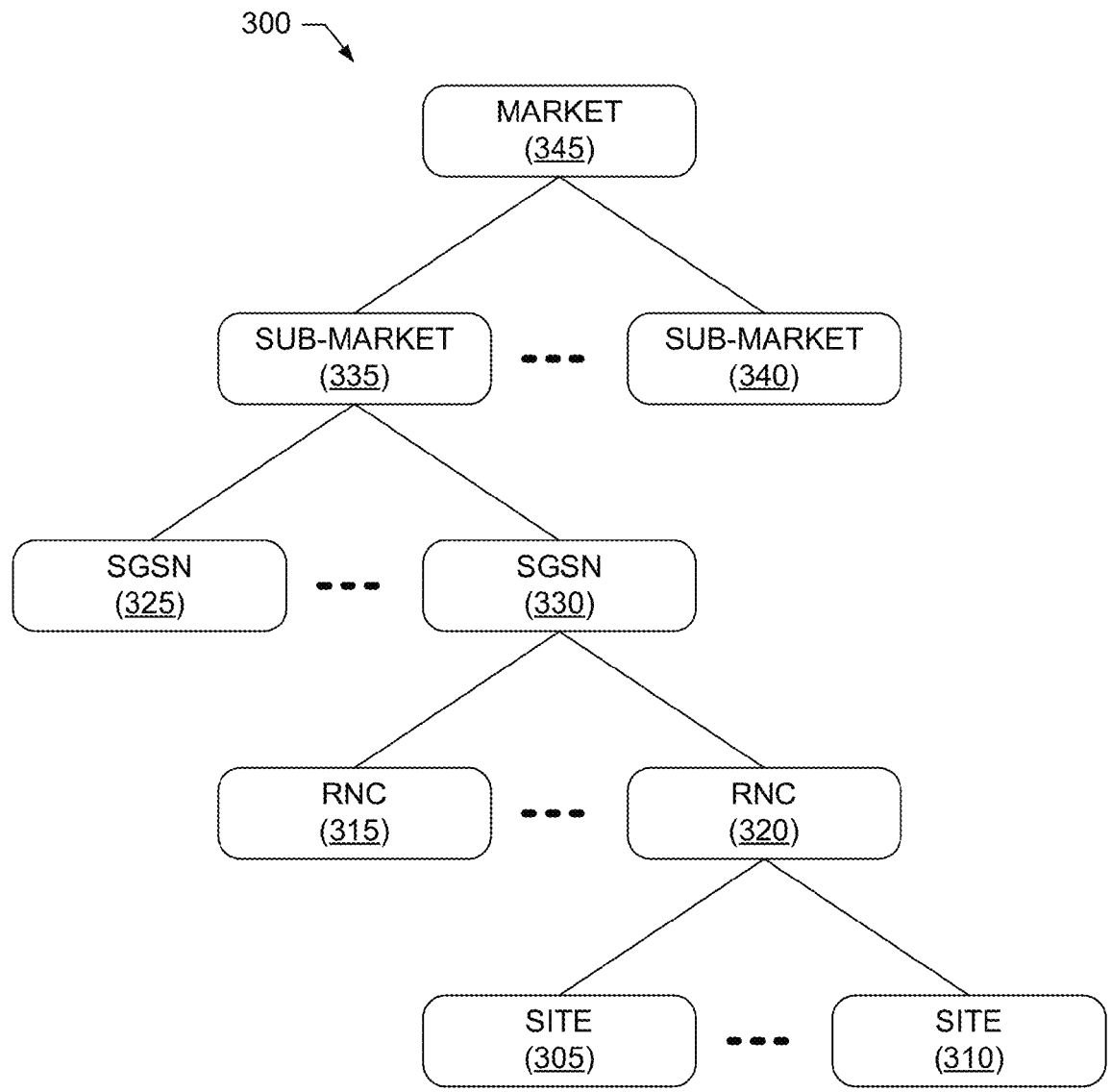
FIG. 3 is a block diagram of a second example hierarchical topology for which the example system of FIG. 1 can perform hierarchical anomaly localization and prioritization.

In the illustrated example, the user workstation 110 can be used to configure a hierarchical topology 115 for which anomalies are to be detected by the anomaly detector 105. Example hierarchical topologies 115 for which the anomaly detector 105 may be configured to perform anomaly detection are illustrated in FIGS. 2-3, which are described in greater detail below. Other configuration information 120, such as anomaly criteria, measurement parameters, etc., for the anomaly detector 105 may additionally or alternatively be configured by the user workstation 110. In some examples, one or more of the hierarchical topology 115 and/or other configuration information 120 may be predetermined (e.g., initialized, hard-coded, etc.) in the anomaly detector 105.

Example hierarchical topologies 200 and 300 that may correspond to the hierarchical topology 115 configured by the user workstation 110 are illustrated in FIGS. 2 and 3, respectively. The example hierarchical topology 200 of FIG. 2 corresponds to a BGP-based network implementing an intelligent content distribution service (ICDS). The example hierarchical topology 300 of FIG. 3 corresponds to a 3rd generation mobile communications network. The hierarchical topologies 200 and 300 include nodes representing physical, logical, geographical, etc., elements of the network aggregated at different levels in the network hierarchy. For a particular node in the hierarchical topology 200 or 300, its descendent node(s) are the node(s) connected to the particular node by one or more edges and located at one or more lower hierarchical levels of the hierarchical topology, whereas its ancestor node(s) are the node(s) connected to the particular node by one or more edges and located at one or more higher hierarchical levels of the hierarchical topology 200/300.

For example, in the hierarchical topology 200 of FIG. 2, the lowest levels of the hierarchy include nodes 205 and 210 representing different BGP prefixes of the BGP-based network, and nodes 215 and 220 representing different geographic regions (e.g., cities) served by the BGP-based network. In the illustrated example, the BGP prefix nodes 205 and 210 are aggregated into one or more ancestor nodes 225 and 230 representing the AS paths associated with these BGP prefixes. For example, the node 225 represents the AS path associated with the BGP prefixes represented by the descendent nodes 205 and 210.

In the example hierarchical topology 200, the BGP prefix nodes 205 and 210, the city nodes 215 and 220, and the AS path nodes 225 and 230 are aggregated into one or more ancestor nodes 235, 240, 245 and 250 representing the autonomous systems associated with each of these descendent nodes. For example, the node 240 represents an original autonomous system associated with the BGP prefix nodes 205/210 and the city nodes 215/220, whereas the node 250 represents a next-hop autonomous system associated with the AS path nodes 225 and 230. The hierarchical topology 200 of the illustrated example further aggregates the autonomous system nodes 235-250 into one or more ancestor nodes 255 and 260 representing the egress routers (e.g., provider edge routers) associated with these autonomous systems. The egress router nodes 255 and 260 are aggregated into a top-level node 265 of the hierarchical topology 200 representing the intelligent content distribution service provided by the BGP-based network.

Turning to the example hierarchical topology 300 of FIG. 3, the lowest level of the hierarchy include nodes 305 and 310 representing different cell sites of the mobile network. In the illustrated example, the site nodes 305 and 310 are aggregated into one or more ancestor nodes 315 and 320 representing the RNCs associated with these cell sites. For example, the node 320 represents the RNC associated with the cell sites represented by the descendent nodes 305 and 310. In the hierarchical topology 300, the RNC nodes 315 and 320 are aggregated into one or more ancestor nodes representing the SGSNs associated with these RNCs. For example, the node 330 represents the SGSN associated with the RNCs represented by the descendent nodes 315 and 320. The SGSN nodes 325 and 330 are further aggregated into one or more ancestor nodes 335 and 340 representing the sub-markets associated with these SGSNs. For example, the node 335 represents the sub-market associated with the SGSNs represented by the descendent nodes 325 and 330. The sub-market nodes 335 and 340 are aggregated into a top-level node 345 of the hierarchical topology 300 representing the market served by the mobile network.

Returning to the illustrated example of FIG. 1, the anomaly detector 105 included in the system 100 can perform any type of anomaly detection processing on measurements 125 obtained for the hierarchical topology 115 configured by the user workstation 110 to detect anomalies associated with one or more nodes of the hierarchical topology 115. For example, the anomaly detector 105 can be configured to process end-to-end round-trip-time (RTT) measurements for communications between an end-user and a server providing a service, such as one or more of the value-added services mentioned above. In such an example, the hierarchical topology 115 can correspond to the network providing the service(s), and the other configuration information 120 can specify parameters for (1) processing the RTT measurements (e.g., averaging over time, segmenting/binning over time, etc.), (2) aggregating the RTT measurements at different nodes in the hierarchical topology 115, (3) determining whether the RTT measurements are indicative of an anomaly (e.g., based on exceeding a specified threshold, deviating from a specified RTT range, etc.), etc.

The anomaly detector 105 of the illustrated example processes the measurements 125 to provide a reported status 130 for the nodes in the hierarchical topology 115. For example, a node associated with a detected anomaly may have a reported status of "abnormal" to indicate that the node is an abnormal node, whereas a node that is not associated with a detected anomaly may have a reported status of "normal" to indicate that the node is a normal node. In some examples, the anomaly detector 105 can also support reporting a status of "indeterminate" for a particular node to indicate that the results of anomaly detection for the particular node were inconclusive (e.g., due to insufficient measurements for that particular node and/or for the associated level of the hierarchical topology 115).

The example system 100 of FIG. 1 includes an example anomaly localizer 135 to receive or otherwise obtain the reported status from the anomaly detector 105 and to locate, or localize, the anomalies in the hierarchical topology 115. As such, in the illustrated example, the anomaly localizer 135 is also configured by the user workstation 110 with the hierarchical topology 115. The example anomaly localizer 135 obtains the reported status 130 from the anomaly detector 105 that indicates whether each node in the hierarchical topology 115 is an abnormal node, a normal node, or an indeterminate node. For example, the reported status 130 obtained from the anomaly detector 105 may include a value of "1" for an abnormal node, a value of "0" for a normal node, and a value of "−1" for an indeterminate node.

In the illustrated example, the anomaly localizer 135 uses the reported status from the anomaly detector 105 to localize the anomalies detected by the anomaly detector 105 in the hierarchical topology 115 into a subset of root cause abnormal nodes of the hierarchical topology 115. For example, in the hierarchical topologies 200 and/or 300 representing communication networks, a single underlying network event (e.g., such as a link failure) may manifest itself as anomalies at different hierarchy levels. As an illustrative example, in the hierarchical topology 200, assume that an underlying network event has caused an increase of RTT for all user requests associated with a particular BGP prefix. In such an example, the anomaly detector 105 can detect the RTT anomaly for the node of the hierarchical topology 200 corresponding to this BGP prefix. Additionally, due to the nature of BGP routing, these user requests may share the same origin AS and AS path. If the user requests from the abnormal BGP prefix experiencing the anomalous RTT dominate other user requests associated with the same origin AS or AS path, the anomaly detector 105 may also detect RTT anomalies for the nodes of the hierarchical topology 200 corresponding to this origin AS and the AS path. In such an example, the anomaly localizer 135 can localize the anomaly to a root cause abnormal node corresponding to the node representing the BGP prefix experiencing the RTT anomaly. As a converse example, if a network event has impacted a particular AS path and created a service anomaly, its associated descendant(s) in the hierarchical topology 200, such as the particular BGP prefixes associated with this AS path, would experience service anomalies as well. In such an example, the anomaly localizer 135 localizes the anomaly to a root cause abnormal node corresponding to the node representing the AS path experiencing the anomaly.

More generally, in the example system 100, the anomaly localizer 135 obtains the reported status 130 from the anomaly detector 105 that identifies a set of abnormal nodes that are associated with detected anomalies at one or more hierarchical levels of a specified hierarchical topology 115. The anomaly localizer 135 then processes this set of reported abnormal nodes to determine and report a subset of root cause abnormal nodes 140, such as a smallest subset of the reported abnormal nodes, that can account for (or cover) all, or a particular portion of, the set of reported abnormal nodes associated with anomalies detected by the anomaly detector 105. In the illustrated example, the anomaly localizer 135 reports the subset of root cause abnormal nodes 140 to the user workstation 110 for display and/or other post-processing. An example implementation of the anomaly localizer 135 is illustrated in FIG. 4, which is described in greater detail below.

Figure 6:
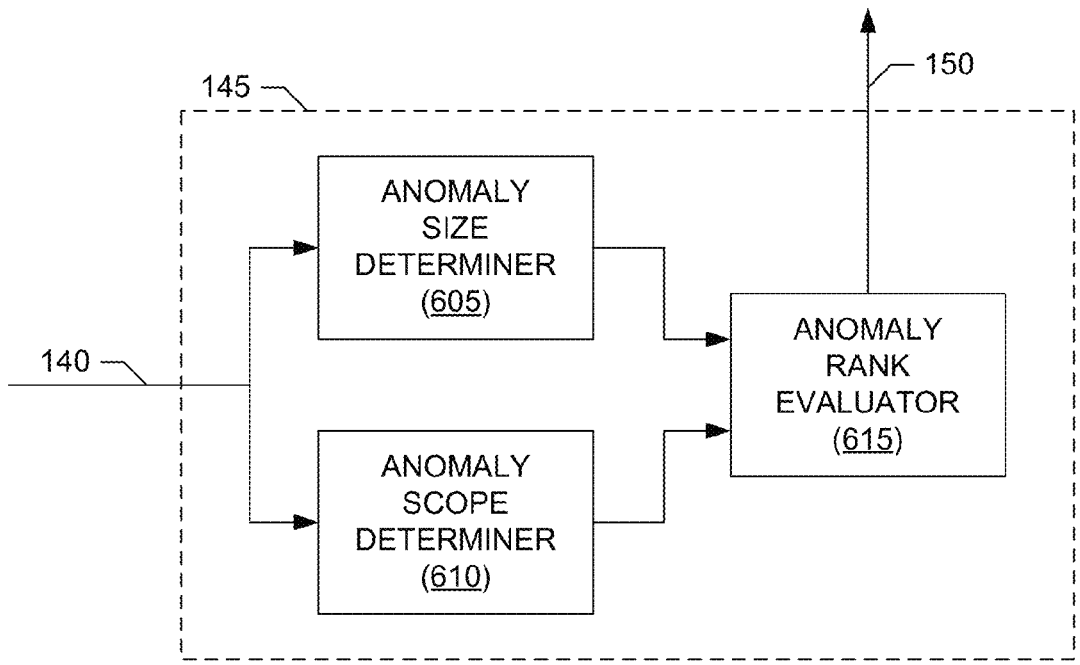
FIG. 6 is a block diagram of an example anomaly prioritizer that can be used to implement the example system of FIG. 1.

The system 100 of FIG. 1 additionally includes an example anomaly prioritizer 145 to also receive or otherwise obtain the subset of root cause abnormal nodes 140 reported by the anomaly localizer 135. In the illustrated example, the anomaly prioritizer 145 prioritizes the root cause abnormal nodes included in the subset of root cause abnormal nodes 140. For example, the anomaly prioritizer 145 can employ a ranking function to provide a ranking 150 of the root cause abnormal nodes included in the subset of root cause abnormal nodes 140. In some examples, the ranking function is based on one or more ranking factors, such as the relative sizes (e.g., magnitude, degree, etc.) of the anomalies associated with the different root cause abnormal nodes, the relative scopes (e.g., number of users affected, number of nodes affected, etc.) of the anomalies associated with the different root cause abnormal nodes, etc. In the illustrated example, the anomaly prioritizer 145 reports the ranking 150 of the root cause abnormal nodes to the user workstation 110 for display and/or other post-processing. An example implementation of the anomaly prioritizer 145 is illustrated in FIG. 6, which is described in greater detail below.

Figure 4:
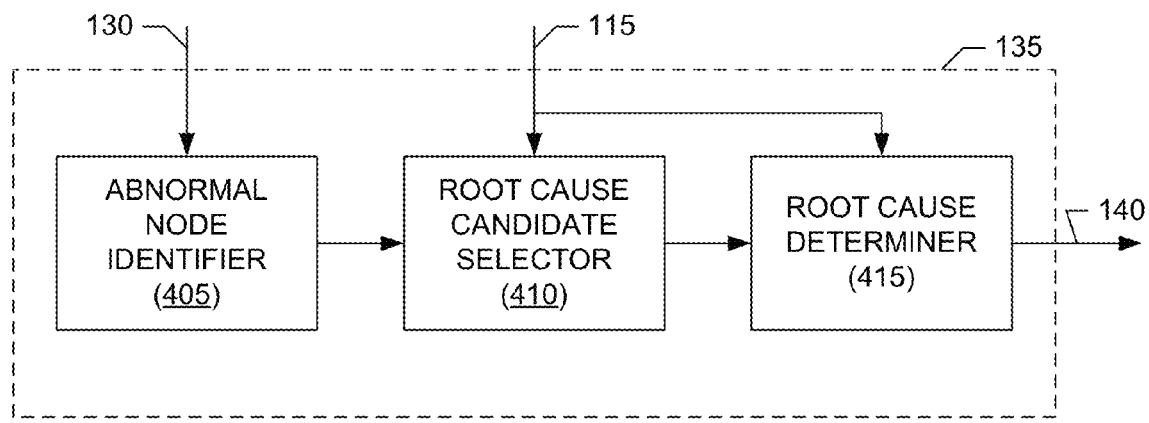
FIG. 4 is a block diagram of an example anomaly localizer that can be used to implement the example system of FIG. 1.

A block diagram of an example implementation of the anomaly localizer 135 of FIG. 1 is illustrated in FIG. 4. The example anomaly localizer 135 of FIG. 4 localizes anomaly events in a hierarchical topology 115. The anomaly events are identified in the reported status 130 (e.g., obtained from the anomaly detector 105) as a set of abnormal nodes included in the hierarchical topology 115. In the illustrated, the anomaly localizer 135 localizes the anomaly events by determining a subset of root cause abnormal nodes 140, such as a smallest number of the reported abnormal nodes, that cover (or account for) all, or a particular portion of, the set of reported abnormal nodes included in the reported status 115. In some examples, the anomaly localizer 135 performs anomaly localization based on the following mathematical problem formulation.

For example, assume that the hierarchical topology 115 for which anomaly detection and localization is to be performed can be represented by a directed acyclic graph (DAG). Examples of such DAGs include, but are not limited to, the example hierarchical topologies 200 and 300 illustrated in FIGS. 2 and 3, respectively. Let N represent the set of nodes in the hierarchical topology 115. For each node n in the set of nodes N (i.e., $\forall n \in N$), let D(n) denote the set of n's descendants, which correspond to the set of zero or more nodes (e.g., referred to as descendent nodes) located at lower hierarchical levels that can be reached from the node n by traversing one or more edges (e.g., via zero or more intervening nodes). Also, for each node n in the set of nodes N (i.e., $\forall n \in N$), let A(n) denote the set of n's ancestors, which correspond to the set of zero or more nodes (e.g., referred to as ancestor nodes) located at higher hierarchical levels that can be reached from the node n by traversing one or more edges (e.g., via zero or more intervening nodes). Additionally, for each node n in the set of nodes N (i.e., $\cdot n \in N$), let d(n) denote the set of n's direct descendants, which are the set of zero or more descendent nodes that can be reached from the node n by traversing only one edge. Furthermore, for each node n in the set of nodes N (i.e., $\forall n \in N$), let a(n) denote the set of n's direct ancestors, which are the set of zero or more ancestor nodes that can be reached from the node n by traversing only one edge. Using the foregoing formulation, the reported status 130 for the hierarchical topology 115 is assumed to have the following two properties, referred to as property P1 and property P2:

Property P1: The reported status 130 for a particular node n indicates that the node is at least one of abnormal, normal or indeterminate. Property P1 can be stated mathematically as follows. Let f(n) denote the reported status for node n. Then, in some examples, for each node n in the set of nodes N (i.e., $\forall n \in N$), the reported status f(n) is given by Equation 1:

$$\forall n \in N : f(n) = \begin{cases} 1 & \text{if } n \text{ is abnormal} \\ 0 & \text{if } n \text{ is normal} \\ -1 & \text{if } n \text{ is indeterminate} \end{cases} \quad \text{Equation 1}$$

Property P2: Each abnormal node n identified in the reported status 130 (e.g., each node n with a reported status 130 of f(n)=1), has at least one abnormal or indeterminate descendent node (e.g., at least one descendent node x with a reported status 130 of f(x)=1 or f(x)=−1). Property P2 can be represented mathematically using Equation 2:

$$\forall n \in N: f(n)=1 \Rightarrow \exists x \in D(n): f(x)=1 \vee f(x)=-1 \quad \text{Equation 2}$$

Based on the foregoing problem formulation, the example anomaly localizer 135 of FIG. 4 determines a smallest subset A of the set of nodes N in the hierarchical topology 115 (i.e., stated mathematically as choosing A such that $$\underset{A \subseteq N}{\operatorname{argmin}} |A|)$$

that covers the abnormal nodes identified in the reported status 130 (e.g., that covers the nodes n having f(n)=1) subject to one or more constraints. In some examples, the anomaly localizer 135 determines the subset A that satisfies the following three constraints, referred to as constraint C1, constraint C2 and constraint C3:

Constraint C1: Each node a in A must be abnormal. Constraint C1 can be represented mathematically using Equation 3:

$$\forall a \in A: f(a)=1 \quad \text{Equation 3}$$

Constraint C2: The subset A covers all of the abnormal nodes in N. In other words, each abnormal node in N is either in A, or is a descendant of a node in A, or is an ancestor of a node in A. Constraint C2 can be represented mathematically using Equation 4:

$$\forall n \in N: f(n)=1 \Rightarrow \exists a \in A: n=a \vee n \in D(a) \vee n \in A(a) \quad \text{Equation 4}$$

Constraint C3: For any node a in A, the number of a's direct abnormal and indeterminate descendants is larger than the number of a's direct normal descendants. Constraint C3 can be represented mathematically using Equation 5:

$$\forall a \in A: |\{x \in d(a) | f(x)=1 \vee f(x)=-1\}| > |\{x \in d(a) | f(x)=0\}| \quad \text{Equation 5}$$

The subset A determined by the anomaly localizer 135 is referred to as the subset of root cause abnormal nodes 140 that cover the abnormal nodes identified in the reported status 130. As such, each abnormal node a included in the determined subset A is referred to as a root cause abnormal node.

In view of the foregoing formulation of the localization processing performed by the anomaly localizer 135, the example anomaly localizer 135 of FIG. 4 includes an example abnormal node identifier 405 to obtain the reported status 130 (e.g., from the anomaly detector 105) and identify the abnormal nodes of the hierarchical topology 115 indicated by the reported status 130. For example, the abnormal node identifier 405 can identify each abnormal node of the hierarchical topology 115 to be those nodes n having a reported status 130 of f(n)=1.

The example anomaly localizer 135 of FIG. 4 further includes an example root cause candidate selector 410 and an example root cause determiner 415 to implement a greedy algorithm for determining the subset of root cause abnormal nodes 140 (denoted by A above) that cover the abnormal nodes identified by the abnormal node identifier 405. In the illustrated example, the root cause candidate selector 410 selects a set of candidate root cause abnormal nodes (denoted as U) such that each node u in the candidate set U satisfies Constraints 1 and 3 described above. In other words, the root cause candidate selector 410 selects each abnormal node identified by the abnormal node identifier 405 and that has a number of direct abnormal descendants and direct indeterminate descendants that is greater than the number of its direct normal descendants for inclusion in the candidate set U.

In the illustrated example, the root cause candidate selector 410 provides the candidate set U to the root cause determiner 415. The root cause determiner 415 selects the subset of root cause nodes A from the candidate set U such that the root cause subset A satisfies Constraint 2 described above. Furthermore, the root cause determiner 415 performs a greedy selection that attempts to yield the root cause subset A that contains the smallest number of candidate nodes c from the candidate set U. An example operation 500 of the root cause determiner 415 to determine the root cause subset A for an example candidate set U is illustrated in FIG. 5.

Figure 5:
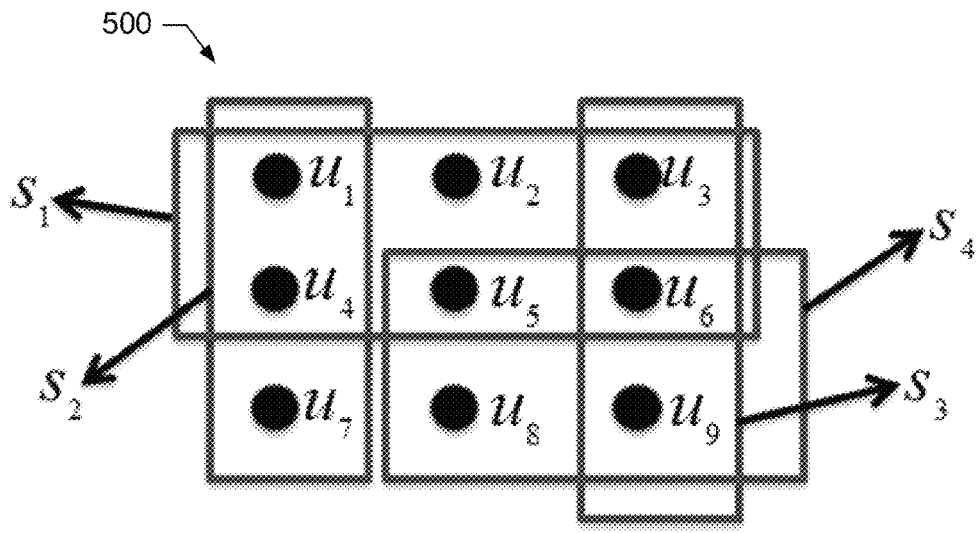
FIG. 5 illustrates an example operation of the example anomaly localizer of FIG. 1.

Turning to FIG. 5, in the illustrated example operation 500 of the root cause determiner 415, the set of abnormal nodes includes nine (9) abnormal nodes $u_1$ through $u_9$ for an example hierarchical topology 115. The example operation 500 also illustrates four example subsets $S_1$ through $S_4$ of the abnormal nodes $u_1$ through $u_9$ representing different groups of the candidate nodes covered in accordance with Constraint 2 by different candidate nodes satisfying Constraints 1 and 3 described above. For example, using set-covering terminology, all the abnormal nodes in the hierarchical topology 115 form a universe. For a particular candidate root cause abnormal node x from the set of abnormal nodes $u_1$ through $u_9$ satisfying Constraints C1 and C3, a respective subset $S_x$ of the universe is formed by the root cause determiner 415. The subset $S_x$ for a particular candidate root cause abnormal node x includes x itself, as well as all of x's descendants and ancestors in the hierarchical topology 115 (e.g., $S_x = x \cup D(x) \cup A(x)$). The result is a family of n subsets $(S_1, S_2, \ldots, S_n)$ that correspond to the n abnormal nodes that satisfy the Constraints C1 and C3. The root cause determiner 415 implements a greedy algorithm to determine the smallest subfamily (or subset) of the n subsets $(S_1, S_2, \ldots, S_n)$ that cover all of the abnormal nodes in the hierarchical topology 115. For example, the root cause determiner 415 iteratively chooses candidate root cause abnormal nodes x that cover most uncovered abnormal nodes until all abnormal nodes of the hierarchical topology 115 are covered. In the illustrated example operation 500, the root cause determiner 415 determines that the four subsets $S_1$ through $S_4$ cover all of the abnormal nodes of the hierarchical topology 115. Accordingly, the root cause determiner 415 selects the candidate root cause abnormal nodes yielding the four subsets $S_1$ through $S_4$ of covered abnormal nodes for inclusion in the root cause abnormal set A.

Figure 7:
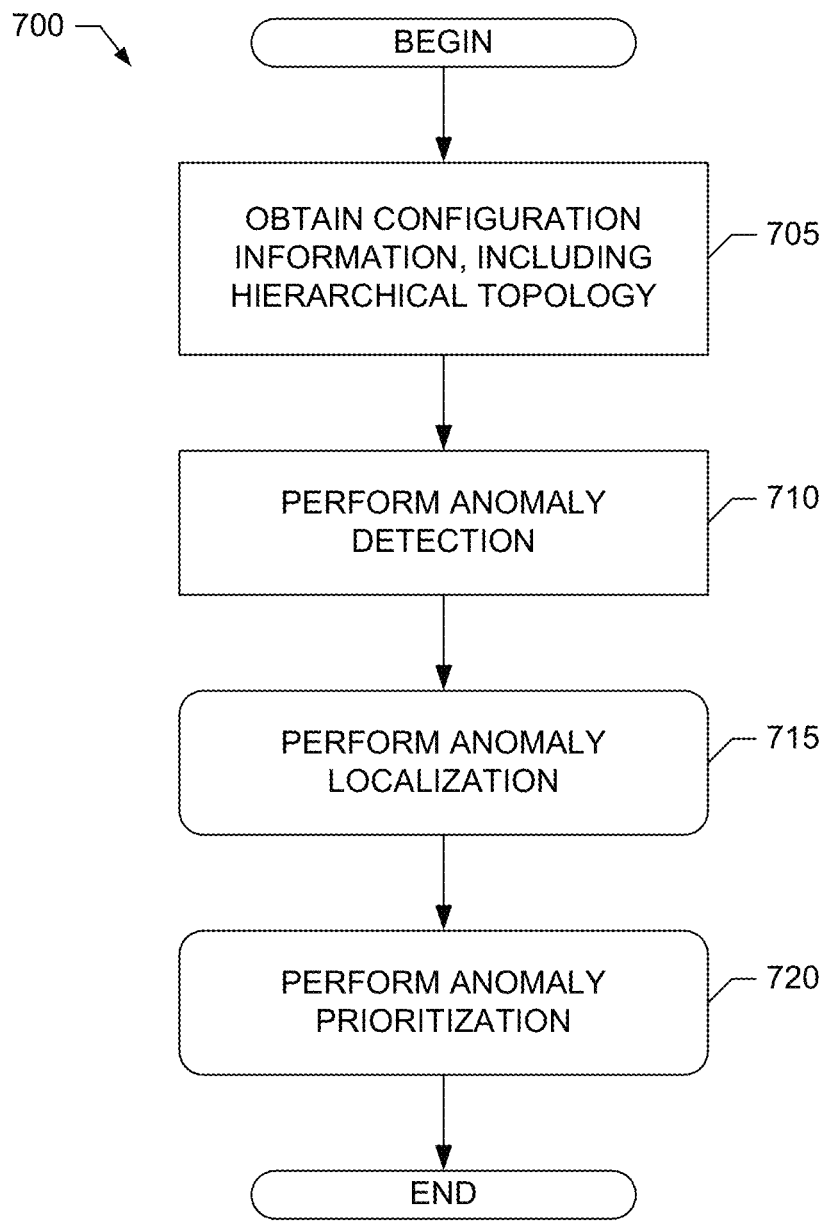
FIG. 7 is a flowchart representative of example machine readable instructions that may be executed to implement the example system of FIG. 1.
Figure 8:
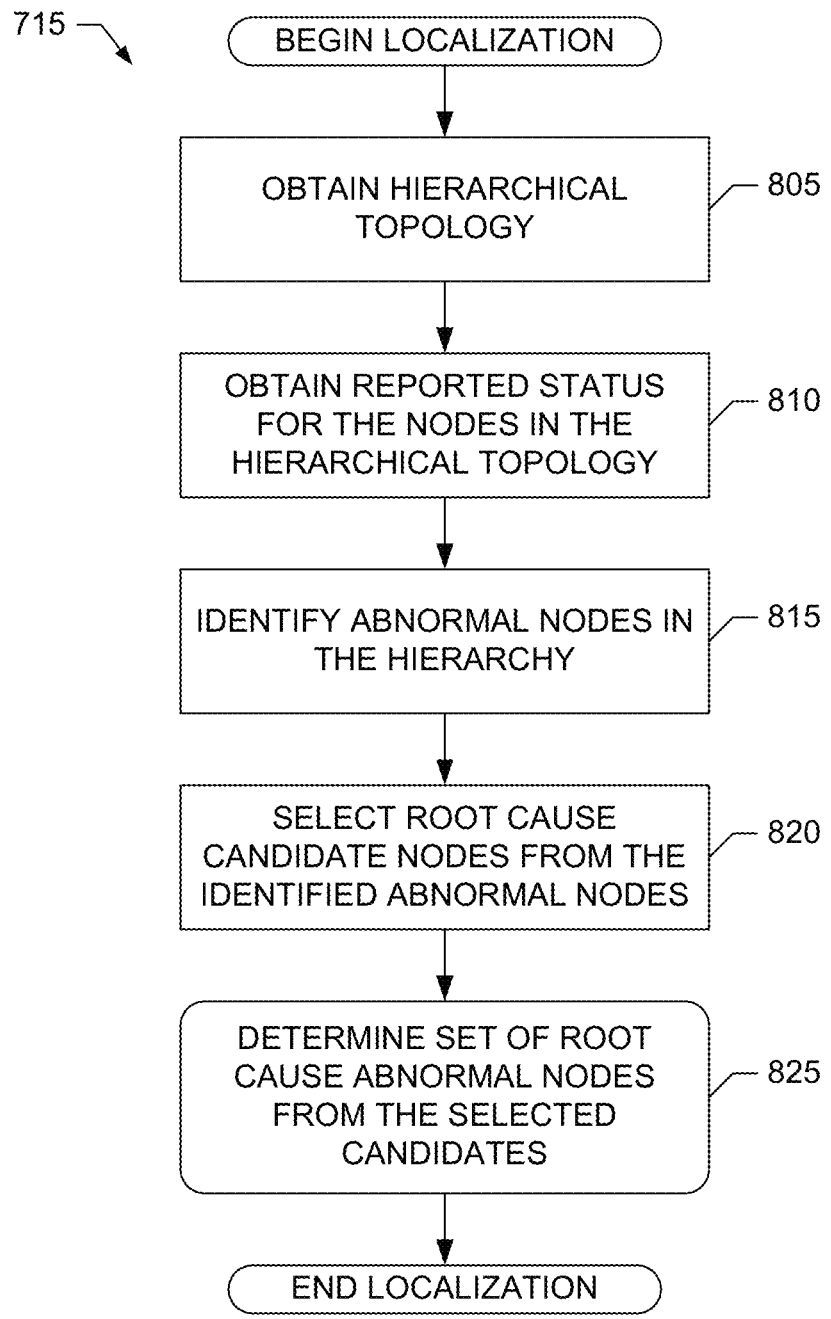
FIG. 8 is a flowchart representative of example machine readable instructions that may be executed to implement the example anomaly localizer of FIG. 4.
Figure 9:
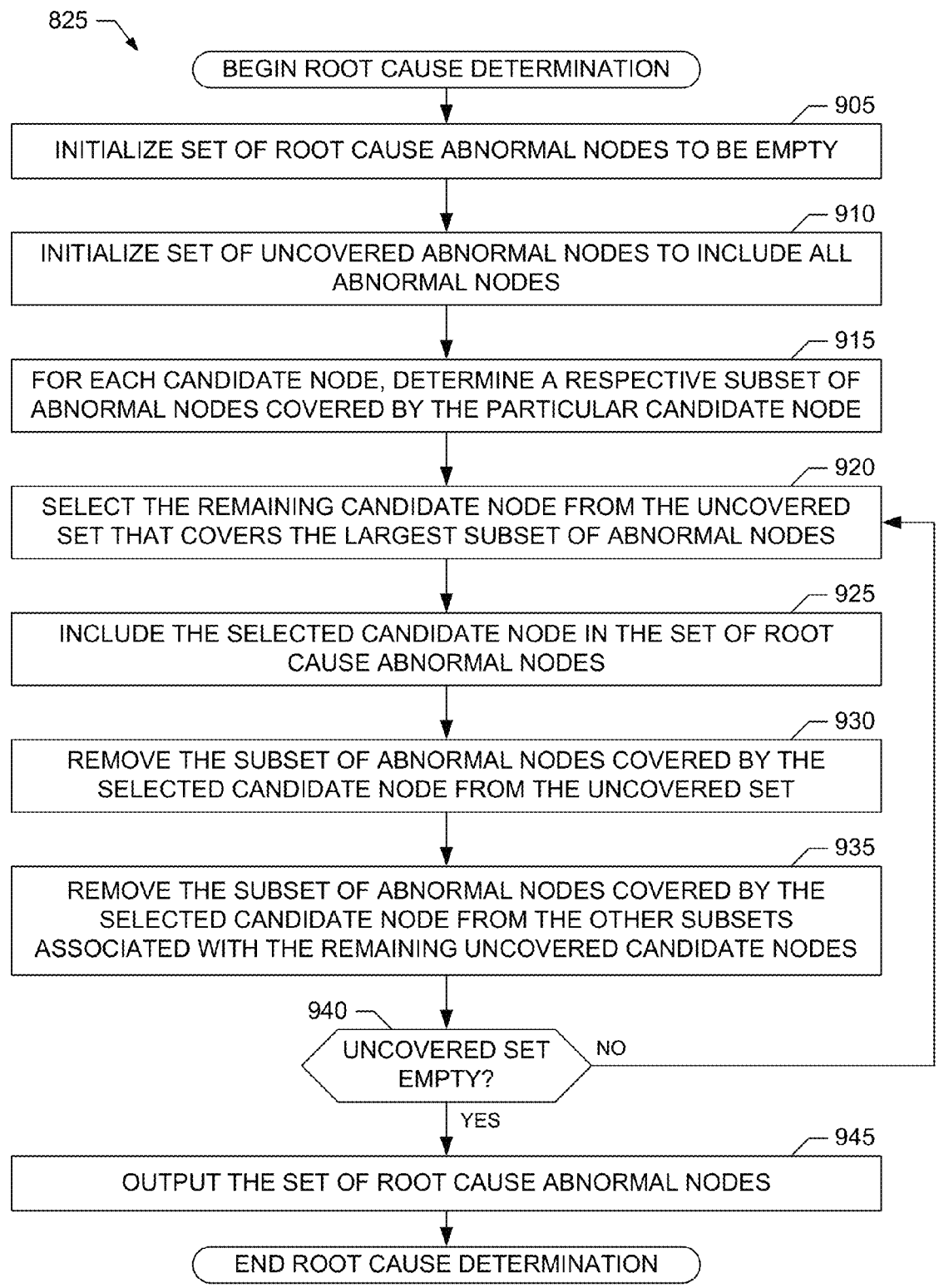
FIG. 9 is a flowchart representative of example machine readable instructions that may be executed to implement a greedy algorithm for use in implementing the example anomaly localizer of FIG. 4 and/or the example machine readable instructions of FIG. 8.

Example machine readable instructions that may be used to implement the anomaly localizer 135 are illustrated in FIGS. 7-10, which are described in greater detail below. In particular, FIGS. 9 and 10 illustrate example machine readable instructions to perform a greedy procedure for root cause abnormal node selection that may be used to implement the root cause determiner 415.

A block diagram of an example implementation of the anomaly prioritizer 145 of FIG. 1 is illustrated in FIG. 6. The anomaly prioritizer 145 of the illustrated example obtains a subset of root cause abnormal nodes 140 (e.g., from the anomaly localizer 135) covering the abnormal nodes detected in a hierarchical topology 115 and determines a ranking 150 of the root cause abnormal nodes. In the illustrated example of FIG. 6, the anomaly prioritizer 145 includes an example anomaly size determiner 605 to determine a size of an anomaly (e.g., such as an anomaly event) associated with a root cause abnormal node included in the subset of root cause abnormal nodes 140. For example, if RTT is used for anomaly detection, then the anomaly size determined by the anomaly size determiner 605 for a root cause abnormal node can correspond to a deviation or variance from an expected RTT at that node in the hierarchical topology, or an RTT magnitude determine at the node in the hierarchical topology, etc. Additionally or alternatively, the anomaly size determiner 605 can determine the deviation, variance, magnitude, degree, etc., of one or more other parameters used to determine that a root cause abnormal node is associated with an anomalous event, anomalous behavior, etc.

The example anomaly prioritizer 145 of FIG. 6 also includes an example anomaly scope determiner 610 to determine a scope of an anomaly (e.g., such as an anomaly event) associated with a root cause abnormal node included in the subset of root cause abnormal nodes 140. For example, the anomaly scope determined by the anomaly scope determiner 610 may correspond to a number of users, network elements, Internet protocol addresses, prefixes, etc., affected by the anomaly associated with the root cause abnormal node. In some example, such as when the hierarchical topology corresponds to a communication network, the scope (or breadth) of an anomaly associated with a node at a higher level in the hierarchical topology is generally larger than the scope (or breadth) of an anomaly associated with a node at a lower level in the hierarchical topology. This is because nodes at higher hierarchical levels generally correspond to an aggregation of nodes at one or more lower hierarchical levels.

The example anomaly prioritizer 145 of FIG. 6 further includes an example anomaly rank evaluator 615 to process anomaly sizes and scopes determined by the anomaly size determiner 605 and the anomaly scope determiner 610, respectively, for the root cause abnormal nodes to determine the ranking 150 of the set of root cause abnormal nodes 140. In some examples, the anomaly rank evaluator 615 implements a ranking function that multiplies the anomaly size for a particular root cause abnormal node and the anomaly scope for the particular root cause abnormal node to determine a ranking value for the particular root cause abnormal node. Other combining operations, such as addition of the anomaly sizes and scopes, normalization of the anomaly sizes and scopes by normalizing factors, etc., may additionally or alternatively be used by the anomaly rank evaluator 615 to combine the anomaly sizes and scopes determined by the anomaly size determiner 605 and the anomaly scope determiner 610. In some examples, the anomaly rank evaluator 615 ranks the root cause abnormal nodes included in the set of root cause abnormal nodes 140 based on the ranking values determined by combining the anomaly sizes and scopes. The anomaly rank evaluator 615 then outputs this ranking 150, which may be represented by an ordering of the root cause abnormal nodes included in the set of root cause abnormal nodes 140, a numerical rank associated with each of the root cause abnormal nodes included in the set of root cause abnormal nodes 140, etc. Additionally or alternatively, the anomaly rank evaluator 615 can report the raw ranking value determined for each root cause abnormal node by combining the respective anomaly scopes and sizes.

While example manners of implementing the system 100 have been illustrated in FIGS. 1, 4 and 6, one or more of the elements, processes and/or devices illustrated in FIGS. 1, 4 and/or 6 may be combined, divided, re-arranged, omitted, eliminated and/or implemented in any other way. Further, the example anomaly detector 105, the example user workstation 110, the example anomaly localizer 135, the example anomaly prioritizer 145, the example abnormal node identifier 405, the example root cause candidate selector 410, the example root cause determiner 415, the example anomaly size determiner 605, the example anomaly scope determiner 610, the example anomaly rank evaluator 615 and/or, more generally, the example system 100 may be implemented by hardware, software, firmware and/or any combination of hardware, software and/or firmware. Thus, for example, any of the example anomaly detector 105, the example user workstation 110, the example anomaly localizer 135, the example anomaly prioritizer 145, the example abnormal node identifier 405, the example root cause candidate selector 410, the example root cause determiner 415, the example anomaly size determiner 605, the example anomaly scope determiner 610, the example anomaly rank evaluator 615 and/or, more generally, the example system 100 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus or system claims are read to cover a purely software and/or firmware implementation, at least one of the example system 100, the example anomaly detector 105, the example user workstation 110, the example anomaly localizer 135, the example anomaly prioritizer 145, the example abnormal node identifier 405, the example root cause candidate selector 410, the example root cause determiner 415, the example anomaly size determiner 605, the example anomaly scope determiner 610 and/or the example anomaly rank evaluator 615 are hereby expressly defined to include a tangible computer readable medium such as a memory, digital versatile disk (DVD), compact disk (CD), etc., storing such software and/or firmware. Further still, the example system 100, the example anomaly localizer 135 and/or the example anomaly prioritizer 145 of FIGS. 1, 4 and 6, respectively, may include one or more elements, processes and/or devices in addition to, or instead of, those illustrated in FIGS. 1, 4 and/or 6, and/or may include more than one of any or all of the illustrated elements, processes and devices.

Flowcharts representative of example machine readable instructions that may be executed to implement the example system 100, the example anomaly detector 105, the example user workstation 110, the example anomaly localizer 135, the example anomaly prioritizer 145, the example abnormal node identifier 405, the example root cause candidate selector 410, the example root cause determiner 415, the example anomaly size determiner 605, the example anomaly scope determiner 610 and/or the example anomaly rank evaluator 615 are shown in FIGS. 7-11. In these examples, the machine readable instructions represented by each flowchart may comprise one or more programs for execution by a processor, such as the processor 1212 shown in the example processing system 1200 discussed below in connection with FIG. 12. Alternatively, the entire program or programs and/or portions thereof implementing one or more of the processes represented by the flowcharts of FIGS. 7-11 could be executed by a device other than the processor 1212 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 7-11 may be implemented manually. Further, although the example machine readable instructions are described with reference to the flowcharts illustrated in FIGS. 7-11, many other techniques for implementing the example methods and apparatus described herein may alternatively be used. For example, with reference to the flowcharts illustrated in FIGS. 7-11, the order of execution of the blocks may be changed, and/or some of the blocks described may be changed, eliminated, combined and/or subdivided into multiple blocks.

As mentioned above, the example processes of FIGS. 7-11 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 7-11 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

Example machine readable instructions 700 that may be executed to implement the system 100 of FIG. 1 are represented by the flowchart shown in FIG. 7. With reference to the preceding figures, the machine readable instructions 700 of FIG. 7 begin execution at block 705 at which the user workstation 110 is used to obtain configuration information, such as the hierarchical topology 115 for which anomaly detection, localization and prioritization is to be performed. Additionally or alternatively, at block 705 the user workstation 110 can be used to obtain the other configuration information 120 used in the system 100.

At block 710, the anomaly detector 105 processes the measurement information 125 to detect anomalies associated with one or more nodes of the hierarchical topology 115. As described above, the anomaly detector 105 can employ any type of anomaly detection processing. At block 710, the anomaly detector 105 also provides reported status 130 for the nodes in the hierarchical topology 115. For example, the reported status 130 can use a value of "1" to indicate an abnormal node, a value of "0" to indicate a normal node, and a value of "−1" to indicate an indeterminate node. Other techniques for representing the status of the nodes in the hierarchical topology 115 may additionally or alternatively be used.

At block 715, the anomaly localizer 135 uses the reported status 130 for the hierarchical topology 115 to perform anomaly localization. For example, the anomaly localizer 135 can identify the abnormal nodes indicated by the reported status 130 and determine a subset of root cause abnormal nodes 140 that cover (e.g., account for, explain, etc.) all, or a portion of, the abnormal nodes indicated by the reported status 130. Example machine readable instructions that may be used to implement the processing at block 715 are illustrated in FIG. 8, which is described in greater detail below.

Figure 11:
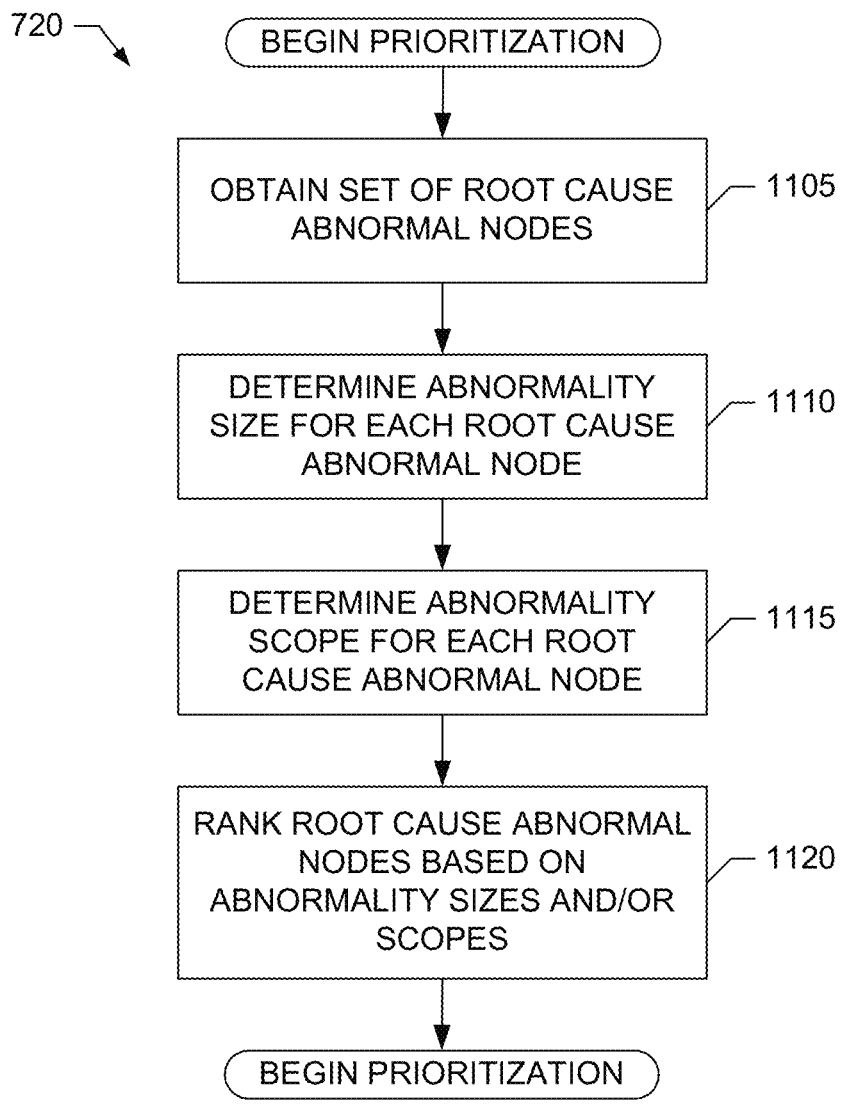
FIG. 11 is a flowchart representative of example machine readable instructions that may be executed to implement the example anomaly prioritizer of FIG. 6.

At block 720, the anomaly prioritizer 145 prioritizes the root cause abnormal nodes included in the subset of root cause abnormal nodes 140 determined at block 715. For example, the anomaly prioritizer 145 can rank the root cause abnormal nodes based on one or more parameters, such as an anomaly size, and anomaly scope, etc., or a combination thereof. Example machine readable instructions that may be used to implement the processing at block 720 are illustrated in FIG. 11, which is described in greater detail below.

Example machine readable instructions 715 that may be executed to implement the anomaly localizer 135 of FIGS. 1 and 4 are represented by the flowchart shown in FIG. 8. With reference to the preceding figures, the machine readable instructions 715 of FIG. 8 begin execution at block 805 at which the anomaly localizer 135 obtains the hierarchical topology 115 for which anomaly localization is to be performed. For example, the hierarchical topology 115 may be specified by the user workstation 110, pre-configured, etc., or any combination thereof. The hierarchical topology 115 may be represented using any data structure, format, file, etc., or combination thereof capable of describing nodes, edges, descendent relationships, ancestor relationships, etc.

At block 810, the abnormal node identifier 405 of the anomaly localizer 135 obtains the reported status 130 for the nodes included in the hierarchical topology 115. For example, the reported status 130 can use a value of "1" to indicate an abnormal node, a value of "0" to indicate a normal node, a value of "−1" to indicate an indeterminate node, etc. Other techniques for representing the status of the nodes in the hierarchical topology 115 may additionally or alternatively be used.

At block 815, the abnormal node identifier 405 uses the reported status 130 obtained at block 810 to identify the abnormal nodes detected in the hierarchical topology 115. For example, the abnormal node identifier 405 can identify the abnormal nodes to be those nodes having a reported status set to "1" or another value representative of an abnormal status. At block 820, the root cause candidate selector 410 of the anomaly localizer 135 selects a set of candidate root cause abnormal nodes such that each node in the candidate set satisfies Constraints 1 and 3 described above. In other words, at block 820, the root cause candidate selector 410 selects a set of candidate root cause abnormal nodes such that each candidate root cause node in the set is an abnormal node and has a number of direct abnormal and indeterminate descendants that is larger than the number of its direct normal descendants.

At block 825, the root cause determiner 415 of the anomaly localizer 135 determines a subset of root cause abnormal nodes from the set of candidate root cause abnormal nodes selected at block 820. For example, at block 825 the root cause determiner 415 selects the subset of root cause nodes 140 from the candidate set such that the root cause subset 140 satisfies Constraint 2 described above and, thus, covers all, or a portion of, the abnormal nodes of the hierarchical topology 115. In some examples, the root cause determiner 415 implements a greedy algorithm that attempts to select the smallest subset of root cause nodes 140 that covers all of the abnormal nodes identified in the hierarchical topology 115. Example machine readable instructions that may be used to implement the processing at block 825 are illustrated in FIG. 9, which is described in greater detail below.

Example machine readable instructions 825 to perform an example greedy algorithm to implement the root cause determiner 415 of the anomaly localizer 135 of FIG. 4 are represented by the flowchart shown in FIG. 9. Example pseudocode 1000 that may be used to implement the machine readable instructions 825 is illustrated in FIG. 10. For simplicity and clarity, the example pseudocode 1000 of FIG. 10 is described together with the description of the example machine readable instructions 825 of FIG. 9. As such, and with reference to the preceding figures, the machine readable instructions 825 of FIG. 9 begin execution at block 905 at which the root cause determiner 415 initializes the set of root cause abnormal nodes 140 to be empty (e.g., the null set). The processing at block 905 corresponds to section 1005 of the pseudocode 1000 of FIG. 10.

At block 910 of FIG. 9, the root cause determiner 415 initializes a set representing the uncovered abnormal nodes to include all identified abnormal nodes of the hierarchical topology 115. The processing at block 910 also corresponds to section 1005 of the pseudocode 1000 of FIG. 10. The goal of the greedy algorithm implemented by the root cause determiner 415 is to iteratively select candidate root cause abnormal nodes to determine a smallest subset that covers the abnormal nodes included in the uncovered set. Each time a candidate root cause abnormal node is selected to be a root cause abnormal node for inclusion in the subset 140, the abnormal nodes covered by this selected root cause abnormal node are removed from the uncovered set.

At block 915, the root cause determiner 415 determines, for each candidate root cause abnormal node u (e.g., each abnormal node satisfying Constraints 1 and 3 described above), a respective subset of abnormal nodes $SET_u$ (also denoted by $S_u$, above) that are covered by the respective candidate root cause abnormal node u. The processing at block 910 corresponds to section 1010 of the pseudocode 1000 of FIG. 10. In particular, pseudocode section 1010 includes pseudocode section 1015 in which the subset of abnormal nodes $SET_u$ for the candidate root cause abnormal node u is initialized to include the candidate node u itself. Pseudocode section 1020 included in pseudocode section 1010 adds the descendent abnormal nodes covered by the candidate node u to its covered node subset $SET_u$. Pseudocode section 1025 included in pseudocode section 1010 adds the ancestor abnormal nodes covered by the candidate node u to its covered node subset $SET_u$.

At block 920 of FIG. 9, the root cause determiner 415 selects the candidate root cause abnormal node u remaining in the uncovered set of abnormal nodes that has largest covered node subset $SET_u$. In other words, at block 920 the root cause determiner 415 selects a next candidate root cause abnormal node u that covers the largest subset of abnormal nodes that have not yet been covered by a previously selected candidate root cause abnormal node. The processing at block 920 corresponds to pseudocode section 1030 included in the pseudocode 1000 of FIG. 10.

At block 925 of FIG. 9, the root cause determiner 415 includes the candidate root cause abnormal node u selected at block 920 as a root cause abnormal node in the subset of root cause abnormal nodes 140. The processing at block 925 corresponds to pseudocode section 1035 included in the pseudocode 1000 of FIG. 10. At block 930 of FIG. 9, the root cause determiner 415 removes the subset $SET_u$ of abnormal nodes covered by the selected candidate root cause abnormal node u from the uncovered set (because these abnormal nodes are now covered by a root cause abnormal node in the subset of root cause abnormal nodes 140). The processing at block 930 corresponds to pseudocode section 1040 included in the pseudocode 1000 of FIG. 10. Additionally, at block 935 the root cause determiner 415 removes the subset $SET_u$ of abnormal nodes covered by the selected candidate root cause abnormal node u from the other covered subsets corresponding to the other remaining candidate root cause abnormal nodes. The processing at block 930 corresponds to pseudocode section 1045 included in the pseudocode 1000 of FIG. 10.

At block 940, the root cause determiner 415 determines whether the uncovered set of abnormal nodes is empty (e.g., because all abnormal nodes are covered by candidate nodes that have been selected to be root cause abnormal nodes included in the subset 140). If the uncovered set is not empty (block 940), processing returns to block 920 and blocks subsequent thereto to enable the root cause determiner 415 to select a next candidate root cause abnormal node u for inclusion in the subset of root cause abnormal nodes 140. However, if the uncovered set is empty (block 940), then at block 945 the root cause determiner 415 outputs the determined subset of root cause abnormal nodes 140.

Example machine readable instructions 720 that may be executed to implement the anomaly prioritizer 145 of FIGS. 1 and 6 are represented by the flowchart shown in FIG. 11. With reference to the preceding figures, the machine readable instructions 720 of FIG. 11 begin execution at block 1105 at which the anomaly prioritizer 145 obtains the subset of root cause abnormal nodes 140 that covers the abnormal nodes detected in a hierarchical topology 115. At block 1110, the anomaly size determiner 605 of the anomaly prioritizer 145 determines sizes of the anomalies associated with the respective root cause abnormal nodes included in the subset 140 obtained at block 1105. At block 1115, the anomaly scope determiner 610 of the anomaly prioritizer 145 determines scopes of the anomalies associated with the respective root cause abnormal nodes included in the subset 140 obtained at block 1105. At block 1120, the anomaly rank evaluator 615 of the anomaly prioritizer 145 combines the anomaly sizes determined at block 1110 and the anomaly scopes determined at block 1115 to determine a ranking 150 of the root cause abnormal nodes included in the subset 140.

Figure 12:
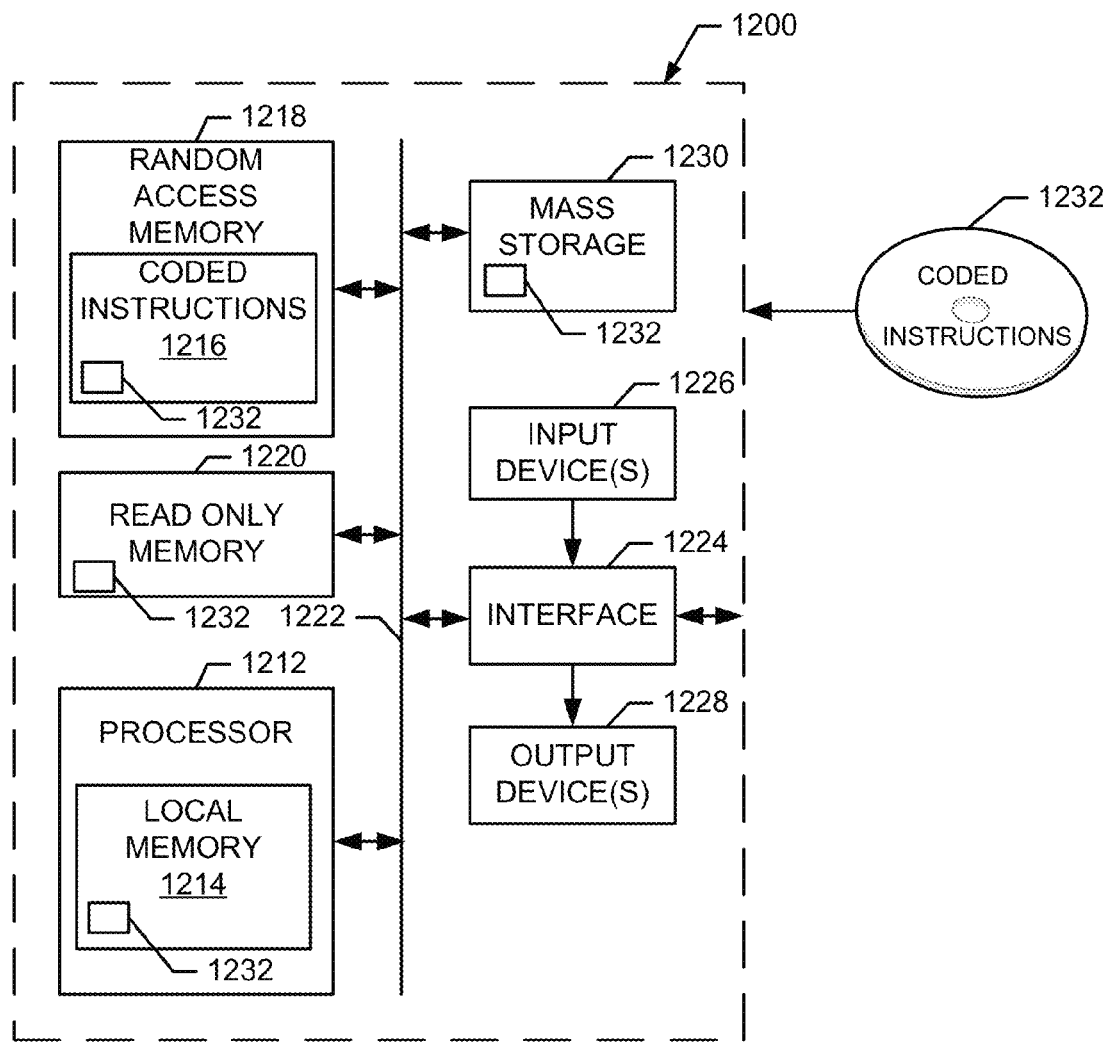
FIG. 12 is a block diagram of an example processing system that may execute the example machine readable instructions represented by FIGS. 7-10 and/or 11 to implement the example system of FIG. 1, the example anomaly localizer of FIG. 4 and/or the example anomaly prioritizer of FIG. 6.

FIG. 12 is a block diagram of an example processing system 1200 capable of implementing the apparatus and methods disclosed herein. The processing system 1200 can be, for example, a server, a personal computer, a tablet computer, a personal digital assistant (PDA), an Internet appliance, or any other type of computing device.

The system 1200 of the instant example includes a processor 1212 such as a general purpose programmable processor. The processor 1212 includes a local memory 1214, and executes coded instructions 1216 present in the local memory 1214 and/or in another memory device. The processor 1212 may execute, among other things, the machine readable instructions represented in FIGS. 7-11. The processor 1212 may be any type of processing unit, such as one or more Intel® microprocessors from the Pentium® family, the Itanium® family and/or the XScale® family, one or more microcontrollers from the ARM® and/or PICO families of microcontrollers, etc. Of course, other processors from other families are also appropriate.

The processor 1212 is in communication with a main memory including a volatile memory 1218 and a non-volatile memory 1220 via a bus 1222. The volatile memory 1218 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1220 may be implemented by flash memory and/or any other desired type of memory device. Access to the main memory 1218, 1220 is typically controlled by a memory controller (not shown).

The processing system 1200 also includes an interface circuit 1224. The interface circuit 1224 may be implemented by any type of interface standard, such as an Ethernet interface, a universal serial bus (USB), and/or a third generation input/output (3GIO) interface.

One or more input devices 1226 are connected to the interface circuit 1224. The input device(s) 1226 permit a user to enter data and commands into the processor 1212. The input device(s) can be implemented by, for example, a keyboard, a mouse, a touchscreen, a track-pad, a trackball, an isopoint and/or a voice recognition system.

One or more output devices 1228 are also connected to the interface circuit 1224. The output devices 1228 can be implemented, for example, by display devices (e.g., a liquid crystal display, a cathode ray tube display (CRT)), by a printer and/or by speakers. The interface circuit 1224, thus, typically includes a graphics driver card.

The interface circuit 1224 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1200 also includes one or more mass storage devices 1230 for storing machine readable instructions and data. Examples of such mass storage devices 1230 include floppy disk drives, hard drive disks, compact disk drives and digital versatile disk (DVD) drives.

The coded instructions 1232 of FIGS. 7-11 may be stored in the mass storage device 1230, in the volatile memory 1218, in the non-volatile memory 1220, in the local memory 1214 and/or on a removable storage medium, such as a CD or DVD 1232.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method to localize anomalies in a communication network, the method comprising:
   identifying, with a processor, a first set of abnormal nodes in the communication network;
   including, with the processor, respective ones of the first set of the abnormal nodes having a number of normal direct descendent nodes that is less than a combined number of abnormal direct descendent nodes and indeterminate direct descendent nodes in a set of candidate nodes; and
   iteratively selecting, with operations performed by the processor, ones of the set of the candidate nodes to include in a set of root cause abnormal nodes representing sources of the anomalies in the communication network, the operations including:
      selecting a first one of the set of the candidate nodes that covers a largest subset of the abnormal nodes from the first set of the abnormal nodes to include in the set of the root cause abnormal nodes;
      removing the largest subset of the abnormal nodes from the first set of the abnormal nodes to determine an updated first set of the abnormal nodes; and
      selecting a second one of the set of the candidate nodes that covers an updated largest subset of the abnormal nodes from the updated first set of the abnormal nodes to include in the set of the root cause abnormal nodes.

2. The method of claim 1, wherein the communication network has a hierarchical topology, and the communication network includes a plurality of nodes at different hierarchical levels of the hierarchical topology.

3. The method of claim 2, further including:
   accessing reported status associated with the plurality of nodes;
   identifying the first set of the abnormal nodes from the plurality of nodes based on the reported status;
   identifying a second set of normal nodes from the plurality of nodes based on the reported status; and
   identifying a third set of indeterminate nodes from the plurality of nodes based on the reported status.

4. The method of claim 1, wherein the operations further include:
   updating the first set of the abnormal nodes after each iteration of selecting a next one of the set of the candidate nodes to include in the set of the root cause abnormal nodes; and
   continuing to iteratively select the ones of the set of the candidate nodes to include in the set of the root cause abnormal nodes until the updated first set of abnormal nodes becomes empty.

5. The method of claim 1, wherein the first one of the set of the candidate nodes is determined to cover an abnormal node from the first set of the abnormal nodes when at least one of: (i) the abnormal node corresponds to the first one of the set of the candidate nodes, (ii) the abnormal node is a descendant of the first one of the set of the candidate nodes, and (iii) the abnormal node is an ancestor of the first one of the set of the candidate nodes.

6. A non-transitory computer readable medium including computer readable instructions which, when executed, cause a processor to perform operations comprising:
   identifying a first set of abnormal nodes in a communication network;
   including respective ones of the first set of abnormal nodes having a number of normal direct descendent nodes that is less than a combined number of abnormal direct descendent nodes and indeterminate direct descendent nodes in a set of candidate nodes; and
   iteratively selecting ones of the set of candidate nodes to include in a set of root cause abnormal nodes representing sources of anomalies in the communication network, the operations for iteratively selecting the ones of the set of the candidate nodes including:
      selecting a first one of the set of the candidate nodes that covers a largest subset of the abnormal nodes from the first set of the abnormal nodes to include in the set of the root cause abnormal nodes;
      removing the largest subset of the abnormal nodes from the first set of the abnormal nodes to determine an updated first set of the abnormal nodes; and
      selecting a second one of the set of the candidate nodes that covers an updated largest subset of the abnormal nodes from the updated first set of the abnormal nodes to include in the set of the root cause abnormal nodes.

7. The non-transitory computer readable medium of claim 6, wherein the communication network has a hierarchical topology, and the communication network includes a plurality of nodes at different hierarchical levels of the hierarchical topology.

8. The non-transitory computer readable medium of claim 7, wherein the operations further include:
   accessing reported status associated with the plurality of nodes;
   identifying the first set of the abnormal nodes from the plurality of nodes based on the reported status;
   identifying a second set of normal nodes from the plurality of nodes based on the reported status; and
   identifying a third set of indeterminate nodes from the plurality of nodes based on the reported status.

9. The non-transitory computer readable medium of claim 6, wherein iteratively selecting the ones of the set of the candidate nodes further includes:
   updating the first set of the abnormal nodes after each iteration of selecting a next one of the set of the candidate nodes to include in the set of the root cause abnormal nodes; and
   continuing to iteratively select the ones of the set of the candidate nodes to include in the set of the root cause abnormal nodes until the updated first set of abnormal nodes becomes empty.

10. The non-transitory computer readable medium of claim 6, wherein the first one of the set of candidate nodes is determined to cover an abnormal node from the first set of the abnormal nodes when at least one of: (i) the abnormal node corresponds to the first one of the set of the candidate nodes, (ii) the abnormal node is a descendant of the first one of the set of the candidate nodes, and (iii) the abnormal node is an ancestor of the first one of the set of the candidate nodes.

11. An apparatus to localize anomalies in a communication network, the apparatus comprising:
   memory including machine readable instructions; and
   a processor to execute the instructions to perform operations including:
   identifying a first set of abnormal nodes in the communication network;
   including respective ones of the first set of abnormal nodes having a number of normal direct descendent nodes that is less than a combined number of abnormal direct descendent nodes and indeterminate direct descendent nodes in a set of candidate nodes; and iteratively selecting ones of the set of candidate nodes to include in a set of root cause abnormal nodes representing sources of the anomalies in the communication network, the operations for iteratively selecting the ones of the set of candidate nodes including:
  selecting a first one of the set of the candidate nodes that covers a largest subset of the abnormal nodes from the first set of the abnormal nodes to include in the set of the root cause abnormal nodes;
  removing the largest subset of the abnormal nodes from the first set of the abnormal nodes to determine an updated first set of the abnormal nodes; and
  selecting a second one of the set of the candidate nodes that covers an updated largest subset of the abnormal nodes from the updated first set of the abnormal nodes to include in the set of the root cause abnormal nodes.

12. The apparatus of claim 11, wherein the communication network has a hierarchical topology, and the communication network includes a plurality of nodes at different hierarchical levels of the hierarchical topology.

13. The apparatus of claim 12, wherein the operations further include:
  accessing reported status associated with the plurality of nodes;
  identifying the first set of the abnormal nodes from the plurality of nodes based on the reported status;
  identifying a second set of normal nodes from the plurality of nodes based on the reported status; and
  identifying a third set of indeterminate nodes from the plurality of nodes based on the reported status.

14. The apparatus of claim 11, wherein iteratively selecting the ones of the set of the candidate nodes further includes:
  updating the first set of the abnormal nodes after each iteration of selecting a next one of the set of candidate nodes to include in the set of the root cause abnormal nodes; and
  continuing to iteratively select the ones of the set of the candidate nodes to include in the set of the root cause abnormal nodes until the updated first set of abnormal nodes becomes empty.

15. The apparatus of claim 11, wherein the first one of the set of candidate nodes is determined to cover an abnormal node from the first set of the abnormal nodes when at least one of: (i) the abnormal node corresponds to the first one of the set of the candidate nodes, (ii) the abnormal node is a descendant of the first one of the set of the candidate nodes, and (iii) the abnormal node is an ancestor of the first one of the set of the candidate nodes.

* * * * *